United States Patent [19]

Stanhope

[11] Patent Number: 5,235,416
[45] Date of Patent: Aug. 10, 1993

[54] SYSTEM AND METHOD FOR PREFORMING SIMULTANEOUS BILATERAL MEASUREMENTS ON A SUBJECT IN MOTION

[75] Inventor: Steven J. Stanhope, Silver Spring, Md.

[73] Assignee: The Government of the United States of America as represented by the Secretary of the Department of Health & Human Services, Washington, D.C.

[21] Appl. No.: 737,872

[22] Filed: Jul. 30, 1991

[51] Int. Cl.$^5$ ............................................. H04N 7/00
[52] U.S. Cl. .................................... 358/101; 358/107; 358/148; 356/375
[58] Field of Search ............... 358/101, 107, 108, 106, 358/113; 362/231; 356/375

[56] References Cited

U.S. PATENT DOCUMENTS

| H12 | 1/1986 | Bennett et al. | 250/363 S |
|---|---|---|---|
| 3,805,049 | 4/1974 | Frank et al. | 362/231 |
| 3,932,042 | 1/1976 | Faami et al. | 358/106 |
| 4,026,656 | 5/1977 | Kusz et al. | 368/113 |
| 4,063,282 | 12/1977 | Exton | 358/106 |
| 4,199,253 | 4/1980 | Ross | 356/5 |
| 4,241,343 | 12/1980 | Fan et al. | 340/755 |
| 4,352,430 | 10/1982 | Maier et al. | 358/106 |
| 4,380,791 | 4/1983 | Nishizawa | 362/231 |
| 4,454,570 | 6/1984 | Morello | 362/231 |
| 4,572,891 | 2/1986 | Drexler | 430/346 |
| 4,710,808 | 12/1987 | Hoogenboom et al. | 358/107 |
| 4,717,952 | 1/1988 | Kohayakawa et al. | 358/113 |
| 4,759,072 | 7/1988 | Yamane et al. | 358/101 |
| 4,788,565 | 11/1988 | Masuda et al. | 354/75 |
| 4,882,498 | 11/1989 | Cochran et al. | 250/571 |
| 4,927,261 | 5/1990 | Rahikainen | 352/39 |
| 4,951,073 | 8/1990 | Slavitter | 354/110 |
| 4,963,798 | 10/1990 | McDermott | 362/231 |
| 5,010,412 | 4/1991 | Garriss | 358/107 |

OTHER PUBLICATIONS

The British Journal of Photography, "Aerosol Photography", Jun. 21, 1974, Shireff-Thomas.

Primary Examiner—John K. Peng
Attorney, Agent, or Firm—Lowe, Price, LeBlanc & Becker

[57] ABSTRACT

A system is provided for performing simultaneous bilateral measurements on a subject in motion at a test location. The system employs a plurality of observed targets attached to the moving subject, the targets being viewed simultaneously by each of two cameras disposed on opposite sides of the subject. Each of the cameras has associated therewith a light source emitting a light of a selected wavelength, the wavelengths for the two cameras being deliberately selected to be different enough to enable each camera to image the light source of the other without corruption of the observed data. The simultaneously operating two camera units may be computer controlled in preprogrammed manner or may be controlled by the operation of a manual control panel. In either case, the overall intensity of the two light sources providing illumination at the two selected different wavelengths facilitates the provision of illumination which avoids confusion by reflectance from the subject at other than the selected targets.

26 Claims, 5 Drawing Sheets

SYSTEM AND METHOD FOR PREFORMING SIMULTANEOUS BILATERAL MEASUREMENTS ON A SUBJECT IN MOTION

FIELD OF THE INVENTION

This invention relates to the performance of simultaneous bilateral measurements for biomechanical investigation of motions performed by a subject, and more particularly to a system and a method for controllably illuminating and bilaterally observing a plurality of targets disposed at selected positions on a moving subject.

BACKGROUND OF THE PRIOR ART

Systems and methods for measuring three-dimensional motions of targets mounted to a moving subject, e.g., a human being, using stereo photogrametric techniques, are well known. In one such technique, video cameras connected to be controlled by a computer are employed to record two-dimensional motions of flat round or spherical targets. Such systems and methods may be utilized in biomechanics analyses in which the subjects are human beings or animals and may even be utilized to study multi-dimensional motions of robots, automobiles subjected to complex external forces, and the like. If two or more video cameras are employed to determine the two-dimensional motion of an observed target, ample computer software is available for calculating an overall three-dimensional motion and, therefore, successive locations of the target.

A basic underlying principle in the automation of two-dimensional target measurements of this type is that the targets be the brightest objects within the field-of-view of each of the cameras. This requirement allows for electronic discrimination of the targets themselves from the subject to which they are mounted as well as the background, using for example a simple threshholding technique on the output video signal from each camera. Typically, a plurality of targets are mounted to the moving subject and are illuminated by bright lights which are usually strobed to freeze the observed target motion. The targets are covered with a highly-reflective material coating and the cameras are pointed toward the targets. Such systems are termed "passive target systems", because the targets do not themselves emit any light but merely reflect it. In such studies, the subject is normally covered in clothing and the subject's skin and clothing each have a lower reflectance capacity than do the targets.

A known problem associated with the passive target technique, due to the required proximity of the subject to the camera and the light source, is that the subject itself may reflect enough light at a level which exceeds the target detection threshold and perhaps even the saturation point on the camera in the system. When this happens, the camera and the computer with which it communicates will receive information not accurately associated with specific target positions. This causes confusion and corrupts the data. One solution that has been tried to overcome this problem is to use the lens F/stop on the camera to decrease the amount of light received by the camera within its field-of-view. This solution, however, is not entirely satisfactory as the desired measurement accuracy requires procedures for the correction of lens nonlinearities, and the modification of the lens characteristics in any such way is best avoided.

In using two cameras to obtain three-dimensional motion data, it is also very important to be able to freely mount and position the cameras and their strobe lighting units on opposite sides of the subject while avoiding the problems that can arise if each of the cameras can image the other camera's strobe lights.

Among the various solutions that have been proposed is the teaching in U.S. Pat. No. 4,199,253, to Ross, namely the use of pulsed radiant lights and three cameras for three-dimensional measurements. The disclosed device utilizes a clock-pulse generator to trigger a light source and the three cameras have separately operated shutters so that light is reflected from spaced-apart zones to the viewed object and reflected light therefrom is recorded.

U.S. Pat. No. 4,951,073 to Slavitter, teaches the use of two conventional cameras, of which one may carry instant film and the other a typical negative film. Actuation of the two cameras is controlled by a synchronizing device so that the shutter of each device is open when the strobe or flash unit of one of the cameras or one of the more remote strobe or flash units controlled by one of the cameras is actuated. Both shutters are opened when the flash fires.

U.S. Pat. No. 4,882,498 to Cochran et al., teaches the use of a primary light source and a ring array of secondary light sources comprising light-emitting elements. Triggering of the light emitting elements is controlled by a computer through a strobe controller. Three-dimensional observations are performed by firing selected combinations of the light emitting elements.

U.S. Pat. No. 4,717,952 to Kohayakawa et al., discloses a medical television system employing a television camera and a selector, the camera itself including a filter for separating visible light into three wavelength regions and transmitting near-infrared rays. The camera also includes an image pickup element sensitive to both visible light and to near-infrared rays. The selector selectively supplies the visible light which is separated by the filter into the three selected wavelength components or the near-infrared rays, to a television camera.

U.S. Statutory Invention Registration No. H12, to Bennett et al., discloses a system employing two large field-of-view scintillation cameras mounted on a rotatable gantry, the cameras being movable diametrically toward or away from each other with respect to the subject. In addition, each of the cameras may be rotated about an axis perpendicular to the diameter of the gantry along which the cameras are movable. By using the two cameras at an angle to each other, improved sensitivity and depth resolution are obtained.

Although the above-discussed references and others teach various solutions, there remains a need for a kinematic data collection tool and a method employing readily available individual components in a system which is simple to operate and readily adaptable to a variety of data collection conditions while maintaining a high level of accuracy.

SUMMARY OF THE INVENTION

A principal object of the present invention is to provide a system for controllably illuminating and observing a plurality of targets mounted to a moving subject to accurately observe target motion and enable three-dimensional analysis of the kinematics of the subject.

A further object of the present invention is to provide a system employing variable intensity controlled wavelength illumination on opposite sides of a moving subject to enable observation of targets disposed on and moving with the subject by observing means disposed on opposite sides of the subject, wherein each observing means is not adversely affected by lighting provided for the other observing means.

An even further object of the present invention is to provide a system employing two camera units on opposite sides of a moving subject, each camera unit being provided with its own variable intensity lighting elements and filter of selected wavelength, for bilaterally illuminating and observing targets mounted on the moving subject, each camera being free to image the other camera and its lighting system without corruption of the data pertaining to the observed motions of the targets.

A related object according to another aspect of this invention is to provide a method for performing simultaneous bilateral measurements on a subject in motion by observing targets mounted to the subject from opposite sides under controlled intensity illumination provided at two different wavelengths so that observations from each side can be performed without adverse influence from illumination provided for observations to be made from the other side.

These and other related objects of this invention are realized by providing a system for performing simultaneous bilateral measurements on a subject at a test location, the system comprising; a plurality of observable targets disposed at selected positions on the moving subject; wavelength-specific first and second target observing means, disposed on opposite sides of said test location and facing the same, for imaging each other while observing those of said targets as are respectively observable; and first and second lighting means respectively cooperating with said first and second target observing means to enable selected observation thereby, for providing lighting at respective first and second wavelengths such that said first observing means observes only at substantially said first wavelength and said second observing means observes only at substantially said second wavelength.

In another aspect of the invention, there is provided a method for performing simultaneous bilateral measurements on a subject in motion at a test location, the method comprising the steps of:

providing a plurality of observable targets disposed at selected positions on the moving subject; disposing wavelength-specific first and second target observing means on opposite sides of said test location and facing the test location for imaging each other while observing those of said targets as are respectively observable; and providing lighting at respective first and second wavelengths such that said first observing means observes only at substantially said first wavelength and said second observing means observes only at substantially said second wavelength.

In the experiment development of this invention the video cameras used were of a type commercially available as Model No. 4700 manufactured by COHV, Inc., of San Diego, Calif.

DESCRIPTION OF THE PREFERRED EMBODIMENTS

Figure 1:
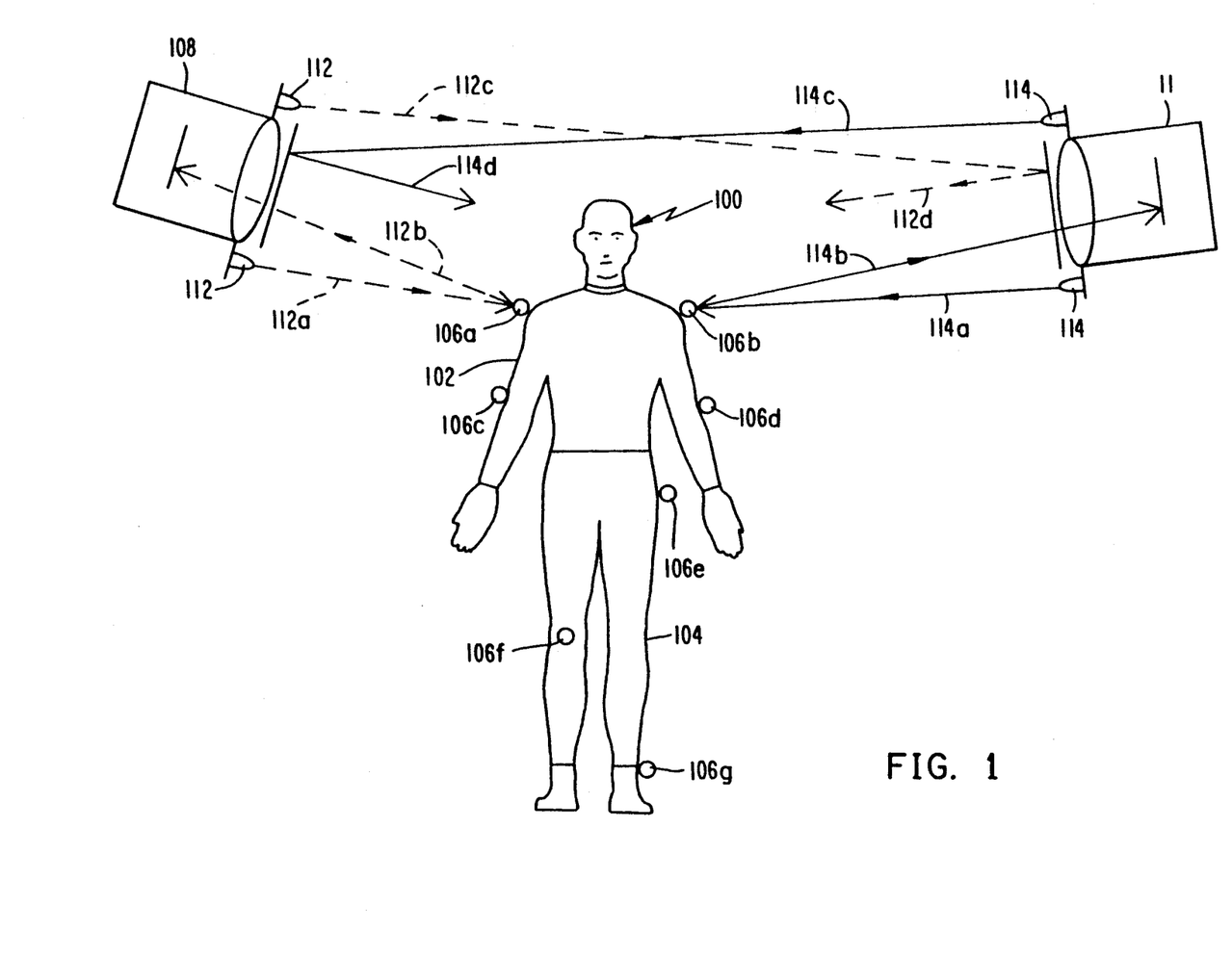
FIG. 1 illustrates in schematic form a preferred embodiment of the present invention employing two observation units disposed on opposite sides of a human subject to observe targets mounted thereon.

In a typical application of the present invention, as best seen in FIG. 1, a human subject 100 whose bodily motions are to be studied is provided upper and lower garments 102, 104 of a material and color having low light reflectance. At selected positions on a subject's body, typically by attachment to garments 102, 104, there are provided a plurality of targets 106a, 106b ... 106n. Although such targets are illustrated in FIG. 1 as being of generally spherical form and as attached from about the shoulders to about the ankles of the subject, this is meant to be merely exemplary and not as restrictive. Thus, utilizing what are known as retroreflective materials, such targets may be made flat or of arbitrary profile and size and may be attached as and where desired within the field-of-view of the cameras employed in the system.

In the preferred embodiment of the system, as best seen in FIG. 1, two observation units 108 and 110, are separately mounted on opposite sides of subject 100, using any known adjustable mounting means (not illustrated for simplicity). In the preferred embodiments, these observation units each contain a conventional video camera, hence will be referred to as "camera units".

Although only two observation units are illustrated in FIG. 1 and their coacting use described fully herein, the invention can be advantageously practiced with more than two observation units. This depends on the desired detail and sophistication of the data to be obtained. Even where only two observation units are employed, it is not necessary for them to be diametrally opposed and pointed directly at each other, although such a disposition may be desired and can be readily employed for particular applications.

As more fully described hereinbelow, each of the exemplary camera units 108, 110 have mounted, preferably around a front portion thereof, a plurality of light sources held in a lighting unit such as 112 or 114. Light from the lighting units is directed to such of the plurality of targets 106a–106n as are observable from the associated camera unit. The light incident on the targets is reflected therefrom and is received by the camera within the camera unit, to be observed, displayed on a video monitor if the camera, is a video camera and/or recorded on a film or video tape for future study and reference.

For ease of reference and a better understanding of the invention, the various incident and reflected light rays are identified as follows:

| Light Ray | Reference Numeral |
| --- | --- |
| Light source 112 to target 106a | 112a |
| Reflected from target 106a to camera unit 108 | 112b |
| Light source 112 to camera unit 110 | 112c |
| Reflected from camera unit 110 | 112d |
| Light source 114 to target 106b | 114a |
| Reflected from target 106b to camera unit 110 | 114b |
| Light source 114 to camera unit 108 | 114c |
| Reflected from camera unit 108 | 114d |

Note that light rays 112a-112d are all illustrated with arrowed broken lines, whereas light rays 114a-114d are all indicated by arrowed solid lines. It is intended by this to indicate that the light emanating from light source 112 associated with camera unit 108 is of a different wavelength than is the light from light source 114 associated with camera unit 110. This provision of light at different wavelengths to facilitate observation by the two different camera units 108 and 110 disposed on opposite sides of the moving subject is an important aspect of the present invention.

Note also that because the camera units are disposed to face each other, they are in a position to image each other while observing the subject 100. It is, however, another important aspect of this invention that light rays such as 112c emanating from light source 112 associated with camera unit 108 do not pass into the opposing camera unit 110, and vice versa and are at most reflected back toward the subject, so that although each camera unit may image the other camera unit it is not influenced by the lighting associated therewith. This insures that each camera unit effectively observes only those targets which are illuminated by light of a specific wavelength emanating from its own associated light source. In the preferred embodiment as described herein in detail, targets themselves are neutral as to the two selected wavelengths, and are capable of reflecting either. Naturally, targets having selected reflectance properties may also be utilized in obvious variations of the present invention, both as to the system and the method discussed and claimed herein.

It is important that when a particular target is illuminated at a selected wavelength it should be observed clearly by the corresponding camera unit with precision. In an easily understood extreme case, if the garment worn by the subject were light and light-reflective, situations would arise where the camera unit observing a reflective target attached to such a reflective garment would be confused as to the exact position of, say, the center of the target. This is clearly a situation to be avoided, and the problem can be mitigated significantly by providing the subject with dark, light-absorptive, colored clothing. More, however, can be done to minimize this problem.

It is, therefore, an important aspect of the present invention that control means be provided to control the intensity of the illumination provided to the targets in such a manner that light reflected from the garments and/or the skin of the human subject is received by a corresponding camera unit at below a selected reactive threshold for the camera unit. At the same time, the reflected light received by that camera unit from an illuminated target observable thereby must be of an intensity above that camera unit's threshold. Given that a variety of circumstances, e.g., skin color of the subject 100, could arise, provision is made in the present invention for deliberately controlling the intensity of each of the light sources 112 and 114 associated with the corresponding camera units 108 and 110. Controls may also be available on the cameras to adjust their thresholds of response.

Figure 2:
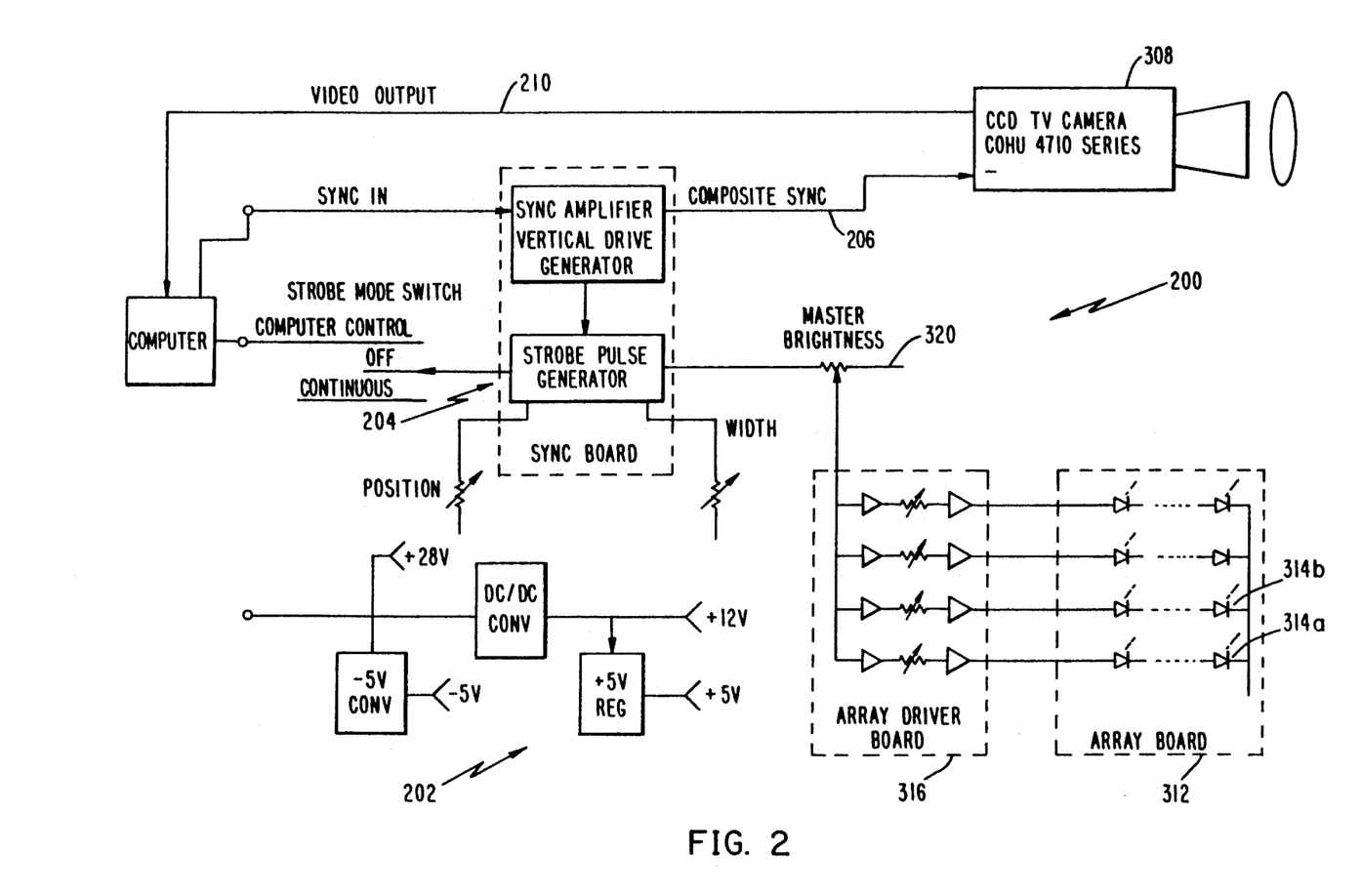
FIG. 2 schematically illustrates a circuit for controlling variable intensity lighting for an observation unit as included in the preferred embodiment of the claimed system.

In order to perform a detailed analysis of the kinematics of the moving body of subject 100, strobing of the illumination provided to the targets 106a-106n is highly desirable. Equipment for thus strobing illumination of controlled intensity is readily available. In the experimental development of this invention the strobe unit program control used was one commercially available as Model No. 00VC300-VX500 manufactured by Oxford Metrics Ltd., Oxford, U.K. The essential elements of a convenient, commercially available, 28V, computer-controllable circuit 200 are illustrated in FIG. 2 in schematic form. Such a circuit controls both the lighting intensity and the strobe pulse rate. As illustrated in FIG. 2, such a circuit conveniently comprises a voltage regulation means 202, a computer-controlled strobe pulse generator 204 and appropriate ancillary elements and wiring 206 to carry appropriate signals. Such systems can be readily designed and may include additional features, hence a more detailed description is not believed necessary. One example, of such a system, is the earlier mentioned one sold by Oxford Metrics.

The essential components of the control circuit and mechanism are illustrated in FIG. 2. The circuit 200 conveniently receives an input in the form of a composite video sync signal and a five (5) volt transistor-to-transistor logic (TTL) signal from a host computer system (not shown). The sync signal is amplified and passed through a vertical drive generator which strips off the vertical interval from the sync signal. As input to the strobe pulse generator 204 the stripped vertical interval pulse is used to drive the timing of the LED flash (strobe). The strobe pulse generator 204 is used to adjust the position and width (2.0 to 2.0 ms duration) of the LED flash with regards to the video signal. The strobe pulse generator 204 will only allow the LEDs to flash when the strobe mode switch is in the continuous mode or in the computer control mode and the TTL voltage is true.

The strobe pulse exits the strobe pulse generator 204 and is under the control of a master brightness circuit 320 which controls the current (0.0 to 1.0 amp) allowed to flow through the LEDs.

The array driver board 316 receives the strobe pulse signal and amplifies it to the magnitude required to drive, preferably, the four segments of 12 LEDs (48 total). Also, the driver board 316 contains four trimmer potentiometers for adjusting the individual output of each of the four sets of 12 LEDs. This allows the user the capability of flattening the illumination over the field of view.

Each of camera units 108 and 110 contains a separate camera, e.g., camera 308 mounted within camera unit 108. The video output from such a camera 208 is conveyed along a line 210 for convenient video display on a known type of display screen (not shown), or a known type of video recorder element (also not shown).

Figure 3:
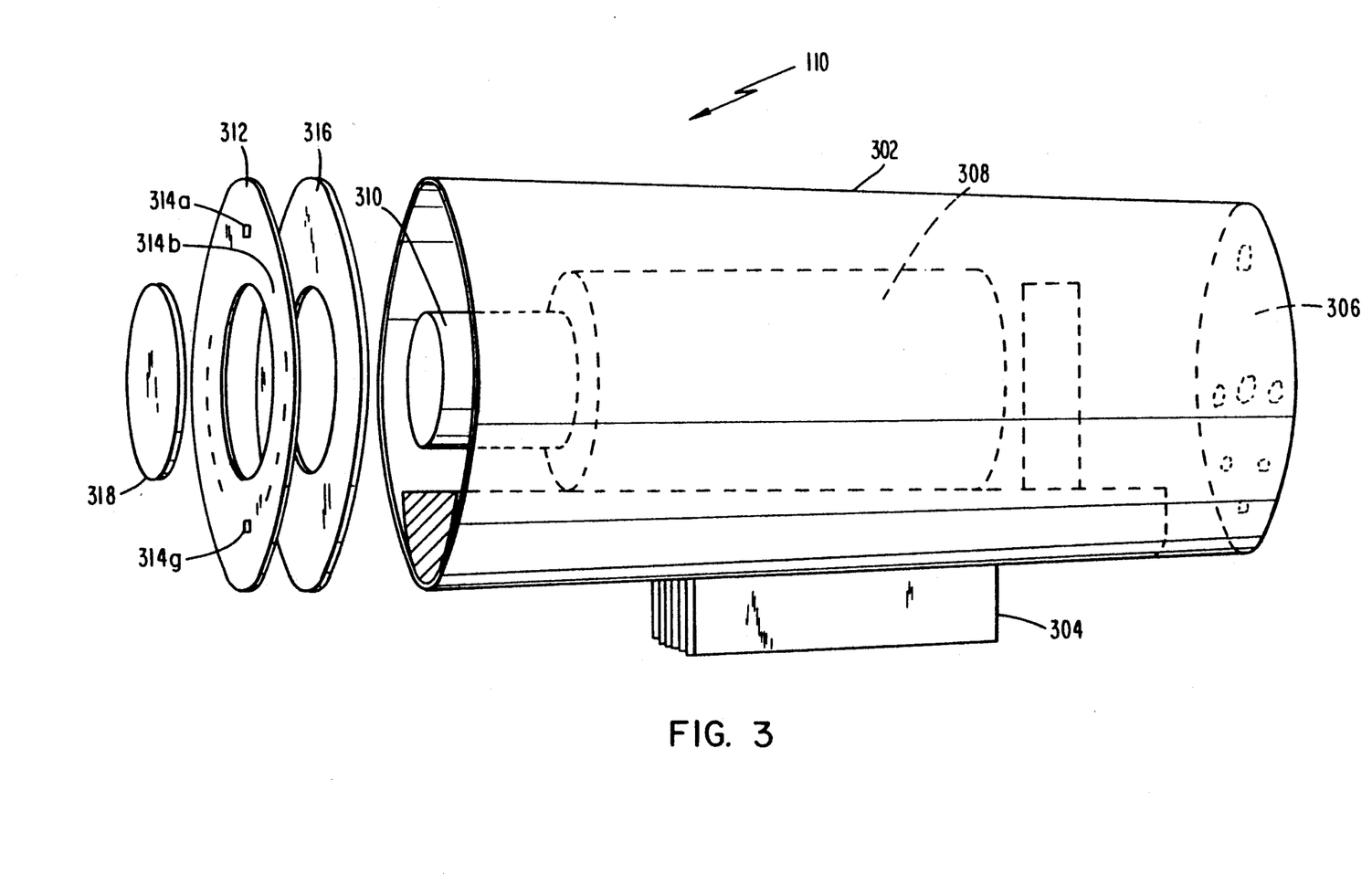
FIG. 3 is a partially exploded perspective view of one of the observation units according to a preferred embodiment of the system per FIG. 1.

Referring now to FIG. 3, there is shown a perspective exploded view of camera unit 110, the other unit 108 being generally similar in structure. The exemplary camera unit 110 has an outer casing 302 and a mount 304 for attachment to a conventional mobile mounting system (not shown). It should be understood that the mounting of camera units 108 and 110 enables a user to freely move and locate the camera units for the desired study of subject 100. It is also understood that the subject 100 will perform his or her motions at a set location and that camera units 108 and 110 will be and their respective cameras disposed at suitable distances and adjusted for observing selected targets from opposite sides.

Casing 302 has a rear end 306 provided with apertures through which cables may be passed to bring power or to convey video signals along lines provided therefore (not shown). Inside the casing 302 there is mounted a video camera 308, for example the previously mentioned type sold by COHV, Inc., having a lens assembly 310 mounted at a forward end thereof. In the preferred embodiment of this invention, the lighting element array board 312 is mounted to the front of casing 302 to mount a plurality of light sources, e.g., light emitting diodes (LEDs) 314a–314n. Between lighting element array board 312 and the immediately adjacent end of casing 302 is conveniently mounted an array driver board 316 connected to the lighting element array board 312, per FIG. 2, for controlling the intensity and the strobing frequency of LEDs 314a–314n. Also, preferably mounted centrally with respect to the array of LEDs 314a–314n is an optical filter 318 selected to transmit light substantially only at a selected wavelength.

As persons of ordinary skill in the optical arts will appreciate, such an optical filter 318 will have a small tolerance band within which light will be transmitted therethrough. As will be understood, each of the camera units 108 and 110 will be provided with a corresponding filter passing light of a different selected wavelength.

By the equipment described hereinabove, in an embodiment employing computer control, light strobed at a selected frequency and delivered at a selected intensity is projected from the forward end around the lens assembly of each camera mounted in the corresponding camera unit and is reflected back from targets observable thereby. The reflected light must pass through the corresponding optical filter, e.g., 318 for camera unit 110, in order to pass through lens assembly 310 to reach elements internal of the corresponding camera, e.g., 308, to be processed therein into a video signal.

In essence, therefore, the present invention includes two parts: an illumination component (which may be controlled manually or by computer), and an optical discrimination component. The illumination component preferably consists of a ring of near-infrared LEDs arrayed in a circumference of sufficient diameter to surround the standard camera lens of the corresponding camera. Other types of controlled intensity lighting elements may also be employed. Mounted centrally of such an LED ring is the selected optical band pass filter, e.g., 318, selected to match the output produced by the near-infrared LEDs. by selecting the LEDs for the two different cameras to have sufficiently different spectral characteristics, and matching the optical filters, e.g., 318, it becomes extremely convenient to place and simultaneously control and use two diametrally opposed imaging devices such as camera units 108, 110 as illustrated in FIG. 1. Each camera therefore reacts only to the reflected light generated by its associated illumination component which provides light at a wavelength which can transmit the specific optical filter associated with that camera but which does not transmit light generated by the LEDs associated with the oppositely placed camera.

In developing this invention two types of LEDs have been used which allow this system to work efficiently. The illumination component associated with each of the cameras would contain only one of these two types of LEDs. For convenience of description, these may be referred to as type A and type B. Type A LEDs may conveniently be Siemens SFH 485, having a peak output intensity at a wavelength of 880 nm and a spectral bandwidth of 80 nm. The type B LEDs may conveniently be Siemens LD 271, having a peak output intensity at a wavelength of 950 nm and a spectral bandwidth of 55 nm. In other words, with each nominal wavelength there is a tolerance or bandwidth of known magnitude. The nominal wavelengths, e.g., 880 nm and 950 nm, are sufficiently different from each other and the respective bandwidths narrow enough to obviate the kind of confusion and data corruption which has plagued other systems utilized in the past and is avoided by the present system.

The optical filters, also known as band pass filters, which constitute the respective discrimination components of the two camera units 108 and 110 may conveniently have the following characteristics: The band past filter matched to LEDs A would have a pass band from 856 nm to 895 nm, while the band pass filter for LEDs B would have a pass band ranging from 928 nm to 972 nm. In the experimental development of this invention the filters of two different wavelengths use were of the types available as Model Nos. 875DF40 and 950DF40 respectively, both manufactured by OMEGA Optical, Inc., of Brattleboro, Vt. There is thus obtained a clear differentiation between the operating illuminations for the two camera units 108, 110 coacting together. In this manner, since the light produced by each of the two strobe units and the light seen by their associated cameras can be restricted to specific wavelengths, the strobe illumination and the associated reflections corresponding to one camera will not be "seen" by the diametrally opposed other camera. This enables accurate non-corrupted bilateral data to be obtained from the moving subjects by simultaneous observation by the two cameras. Among the other advantages, beyond non-corrupted data, are that this system effectively requires relatively short testing times as well as the data reduction times. This translates into more economical and efficient utilization of the time of the operator of the system and the test subjects. Furthermore, the fact that each camera can effectively ignore the lighting related to the other camera allows the two cameras to be positioned in optimum manner according to their ability to image targets, as opposed to being forced to be aimed where they do not "see" the other camera.

The LED lights, e.g., 314a–314n, are most conveniently disposed an array comprising as four sets of LEDs. The combination of exemplary array board 312, array driver board 316 and filter 318 may be mounted to be removable as a single unit to facilitate a quick change over for specific tasks. As illustrated in FIG. 2, the light intensity provided by the LEDs may be controlled by decreasing the current flow through all of them, using a master brightness control 320. Alternative control, in known manner, may be selected and operated to separately control LEDs in each of the four quadrants of the circular disposition illustrated in FIG. 3 in order to "flatten" the illumination over the field of view to avoid highlighting of portions of the subject and associated unevenness in the perceived reflectance therefrom. Such a use of the overall brightness of the LEDs, i.e., the master brightness control technique, as opposed to decreasing the number of active LEDs or the decreasing of the amount of time for which the LEDs are flashed, is preferable, since an even illumination of the field of view and constant sampling timing are thus maintained.

Figure 4:
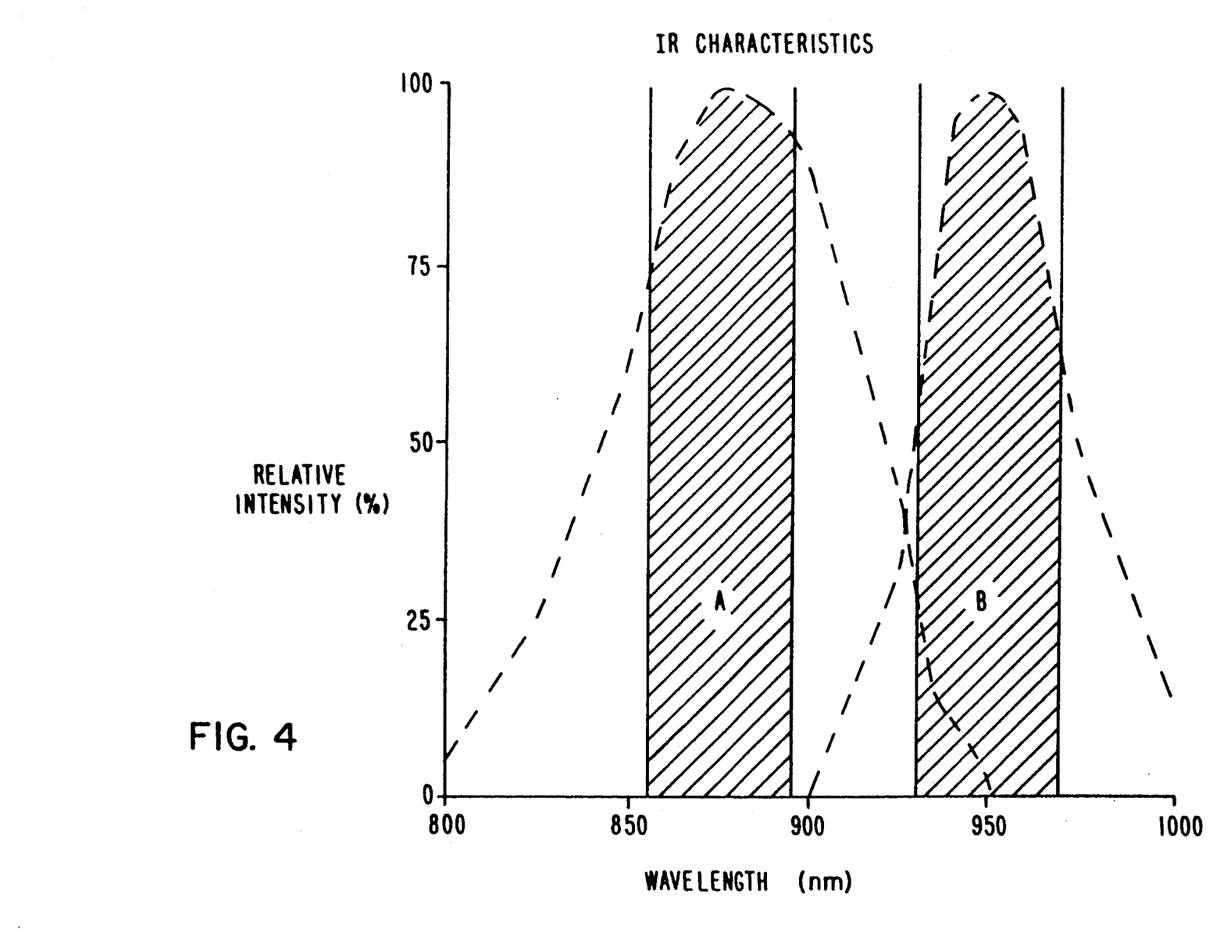
FIG. 4 is a graphical depiction of the variations in relative intensity as a function of wavelength for two selected wavelengths for illumination according to a preferred embodiment of the invention.

As noted earlier, the wavelengths to which the two camera units respond are selected to allow each camera to generate uncorrupted data even when imaging the other. FIG. 4 graphically illustrates how the different wavelengths ensure the desired difference in observed intensities of the related lighting.

Figure 5:
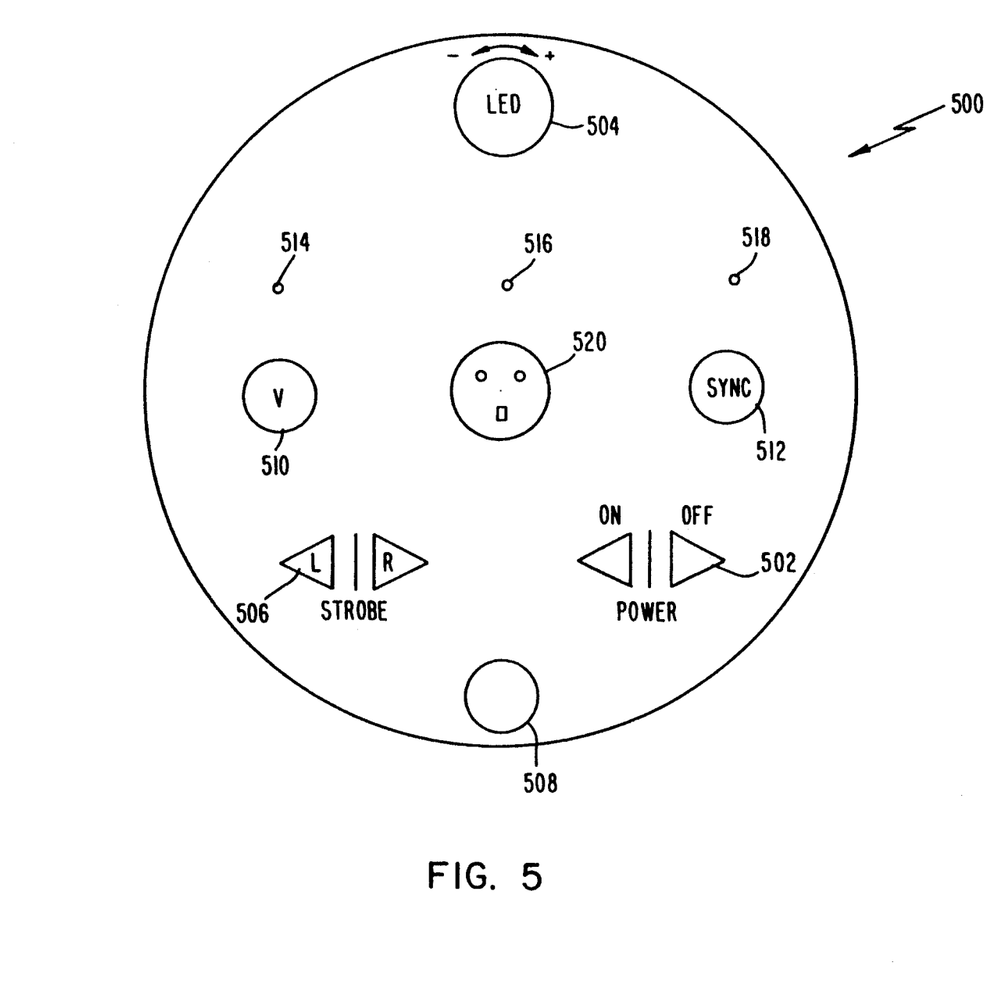
FIG. 5 is a front elevation view of a manual control panel suitable for enabling manual control of the preferred embodiment of this invention.

According to the present invention, for certain applications, it may be advantageous to enable the user to exercise specific control by use of a manual control panel 500, best seen in exemplary form in FIG. 5. Such a manual control panel would contain push-button or other known types of switching controls such as power switch 502, LED master brightness control 504, strobe mode switch (for local or remote control) 506, strobe mode input switch 508, video actuation switch 510, synchronization ON/OFF switch 512 and the like. Also provided on such a control panel may be video test inputting jacking point 514, power test point 516, and synchronization test point 518, as well as a power input jack 520. Obviously, as persons skilled in the are will appreciate, other forms of a manual control panel can be readily visualized. Such manual control of the equipment can be extremely advantageous for short-run adaptive experiments or studies to evaluate different motion regimens, types of targets, selection of LEDs, and the like.

On the other hand, where a number of subjects have to be tested in comparable manner, or when an evolving series of tests have to be performed on one or more test subjects with predetermined variations in parameters, programmed computerized control of the equipment may be more advantageous. What is essential to appreciate is that the present invention lends itself to ready adaptation to either manual control or computer control in known manner. The type of computer control software and operation required for the practice of this invention should be well within the programming and operating skills of persons of ordinary skill in the art and will, therefore, not be described in detail for the sake of conciseness.

In practicing this invention, a suitable location would be determined for the subject to engage in the motions deemed to be of interest. Selected locations would be determined on the subject and appropriate reflective targets attached thereat. The two camera units would then be positioned, as generally illustrated in FIG. 2, at suitable heights and distances from the subject to facilitate clear viewing of one or more targets of interest. Suitable illumination units would be fitted to the camera units, i.e., suitable LEDs and filters would be selected for the two cameras, and the system checked out for correct synchronization and effective controls. The subject would thereafter engage in appropriate motions, the two cameras would respectively observe and/or record, e.g., with the use of known video recording equipment, the observed motions. Intermediate displays of the observed motions may be made in any convenient known manner, e.g., on a video monitor by one or more dots or lines of selected color and/or intensity to indicate different observed targets. The observed/recorded data may then be processed in appropriate manner to serve the user's perceived needs.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A system for performing simultaneous bilateral measurements on a subject in motion at a test location, comprising:
   a plurality of observable targets disposed at selected positions on the moving subject;
   wavelength-specific first and second target observing means, disposed on opposite sides of said test location and facing the same, for imaging each other while observing those of said targets as are respectively observable; and
   first and second lighting means, respectively cooperating with said first and second target observing means to enable selected observation thereby, for providing lighting at respective first and second wavelengths such that said first observing means observes only at substantially said first wavelength and said second observing means observes only at substantially said second wavelength.

2. The system according to claim 1, wherein:
   said first and second target observing means comprise respective first and second cameras and corresponding first and second filters coacting therewith to enable observation thereby only at substantially said first and second wavelengths respectively.

3. The system according to claim 2, wherein:
   said first and second cameras are positioned diametrally opposite each other with respect to said test location.

4. The system according to claim 2, wherein:
   said first and second lighting means each comprise a respective plurality of controlled-intensity light emitting diodes (LEDs) arrayed between the respective first and second cameras and the corresponding first and second filters coacting therewith.

5. The system according to claim 4, further comprising:
   control means for selectively controlling said first and second lighting means.

6. The system according to claim 5, wherein:
   said control means comprises means for strobing said first and second lighting means.

7. The system according to claim 6, wherein:
   said control means comprises means for adjusting an intensity of the lighting provided by the respective first and second lighting means.

8. The system according to claim 7, wherein:
   said control means comprises individual first and second driving boards for respectively controlling said first and second lighting means; and
   said first and second lighting means and the corresponding first and second driving boards are assembled as respective lighting units fittable to said first and second cameras to provide corresponding controlled lighting therefor.

9. The system according to claim 7, wherein:

said control means comprises a control panel with individual manually operable means for controlling said first and second lighting means for control of said strobing and intensity of lighting provided thereby.

10. The system according to claim 9, wherein:
said control panel further comprises manually operable means for controlling said first and second cameras.

11. The system according to claim 10, further comprising:
means for visually displaying and selectively recording observations by said first and second cameras.

12. The system according to claim 4, further comprising:
computer controlled means for selectively controlling said lighting means and said cameras.

13. The system according to claim 12, further comprising:
computer controlled means for visually displaying and selectively recording observations by said first and second cameras.

14. A method for performing simultaneous bilateral measurements on a subject in motion at a test location, comprising the steps of:
providing a plurality of observable targets disposed at selected positions on the moving subject;
disposing wavelength-specific first and second target observing means on opposite sides of said test location and facing the test location, for imaging each other while observing those of said targets as are respectively observable; and
providing lighting at respective first and second wavelengths such that said first observing means observes only at substantially said first wavelength and said second observing means observes only at substantially said second wavelength.

15. The method according to claim 14, wherein:
the step of providing said lighting at respective first and second wavelengths comprises the steps of controllably operating lighting sources and providing respective filters selected to pass light at corresponding first and second wavelengths, to facilitate respective observations by said first and second target observing means,
whereby said first and second target observing means are enabled to each observe only at substantially the corresponding selected wavelength respectively.

16. The method according to claim 15, wherein:
said first and second target observing means are positioned diametrally opposite each other with respect to said test location.

17. The method according to claim 16, comprising the further step of:
controlling said first and second lighting means to adjust an intensity of the lighting provided thereby.

18. The method according to claim 17, wherein:
said steps of controlling said first and second lighting means and observing by said first and second target observing means are effected by manual operation of corresponding controls disposed on a manual control panel.

19. The method according to claim 17, comprising the further step of:
operating a computer for controlling said steps of providing said lighting at said first and second wavelengths and observing said target by said first and second target observing means thereby.

20. A system for bilateral, variable intensity, wavelength-discriminated, illumination for simultaneous bilateral observation of targets mounted to a moving subject, comprising:
first and second lighting means for providing first and second lighting at respective controlled intensities; and
means for filtering light provided by said first and second lighting means at respective first and second wavelengths, to illuminate selected ones of said targets with said filtered lighting at one or the other of said first and second wavelengths to thereby enable wavelength-specific observations of light reflected from the targets.

21. The method according to claim 17, wherein:
the intensities of lighting provided by said first and second lighting means are controlled to ensure that corresponding light reflected from garments and/or skin of a human subject is received by corresponding observation units at less than respective selected thresholds therefor.

22. The system according to claim 20, further comprising:
means for controlling the intensities of lighting provided by said first and second lighting means to ensure that corresponding light reflected from garments and/or skin of a human subject is received by corresponding observation units at less than respective selected thresholds therefor.

23. The system according to claim 1, wherein:
said plurality of targets may have respective reflectance properties.

24. The system according to claim 23, wherein:
said respective reflectance properties are such as to reflect at one or the other of said first and second wavelengths.

25. The method according to claim 14, wherein:
said step of providing observable targets includes the step of selecting individual targets to have respective reflectance properties.

26. The method according to claim 25, wherein:
said respective reflectance properties are selected to reflect at one or the other of said first and second wavelengths.

* * * * *